US008027263B2

(12) United States Patent
Coronado et al.

(10) Patent No.: US 8,027,263 B2
(45) Date of Patent: *Sep. 27, 2011

(54) METHOD TO MANAGE PATH FAILURE THRESHOLD CONSENSUS

(75) Inventors: Juan A. Coronado, Tucson, AZ (US);
Roger G. Hathorn, Tucson, AZ (US);
Bret W. Holley, Tucson, AZ (US);
Clarisa Valencia, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 169 days.

This patent is subject to a terminal disclaimer.

(21) Appl. No.: 12/241,883

(22) Filed: Sep. 30, 2008

(65) Prior Publication Data

US 2010/0080117 A1    Apr. 1, 2010

(51) Int. Cl.
*H04J 1/16* (2006.01)
(52) U.S. Cl. ........................................ 370/248; 370/252
(58) Field of Classification Search .................. 370/216, 370/217, 218, 219, 351, 389, 419, 420, 241, 370/248, 252; 714/100, 1, 2, 3, 5, 6, 4
See application file for complete search history.

(56) References Cited

U.S. PATENT DOCUMENTS

| 6,157,989 | A | 12/2000 | Collins et al. |
| 6,487,645 | B1 | 11/2002 | Clark et al. |
| 6,907,377 | B2 | 6/2005 | Slaight et al. |
| 6,944,736 | B2 | 9/2005 | Wilson et al. |
| 6,976,122 | B1 | 12/2005 | Sander et al. |
| 7,275,103 | B1 | 9/2007 | Thrasher et al. |
| 7,299,385 | B2 | 11/2007 | Voigt |
| 7,653,014 | B2* | 1/2010 | Costo et al. ............... 370/282 |
| 2004/0057375 | A1* | 3/2004 | Shiragaki et al. ............ 370/216 |
| 2004/0215912 | A1 | 10/2004 | Vergis et al. |
| 2005/0240792 | A1 | 10/2005 | Sicola et al. |
| 2006/0294045 | A1* | 12/2006 | Suggs et al. ..................... 707/1 |
| 2007/0263540 | A1 | 11/2007 | Charzinski et al. |
| 2008/0040088 | A1 | 2/2008 | Vankov et al. |
| 2008/0046611 | A1 | 2/2008 | Miyamoto et al. |
| 2008/0059602 | A1 | 3/2008 | Matsuda et al. |
| 2008/0250042 | A1* | 10/2008 | Mopur et al. ................ 707/100 |
| 2009/0319822 | A1 | 12/2009 | Coronado et al. |
| 2010/0080117 | A1 | 4/2010 | Coronado et al. |

OTHER PUBLICATIONS

D. Malkhi et al., Survivable Consensus Objects, Seventeenth IEEE Symposium on Reliable Distributed Systems, Oct. 1998.

* cited by examiner

*Primary Examiner* — Kwang B Yao
*Assistant Examiner* — Obaidul Huq
(74) *Attorney, Agent, or Firm* — Hamilton & Terrile, LLP; Stephen A. Terrile (57) ABSTRACT

A system for providing hosts with a capability to determine which threshold rule of a plurality of threshold rules to use based upon threshold consensus. For example, the system would address a configuration case of several hosts sharing an output port of a fabric via zoning and that port being connected to a single port of a storage controller. If one host is executing lower priority jobs and its threshold is much higher than another host with higher priority jobs and a lower threshold, and the storage controller recognizes that several hosts are sharing the same storage controller port, the consensus will be to ignore the threshold of the first host and to use the threshold of the second host to prevent performance degradation in the system.

18 Claims, 6 Drawing Sheets

METHOD TO MANAGE PATH FAILURE THRESHOLD CONSENSUS

BACKGROUND OF THE INVENTION

1. Field of the Invention

The present invention relates in general to the field of computers and similar technologies, and in particular to managing path failure threshold consensus within computer system environments.

2. Description of the Related Art

Computing devices generate information. It is known in the art to store such information using a plurality of data storage devices disposed in an automated data storage system. An originating host computer may be in communication with a storage controller using a plurality of communication paths.

Using prior art methods, when a host computer detects a path failure during I/O to a storage device the host computer begins a path verification protocol. The host computer typically sends path verification commands to the device through each logical path recited in a device path mask. If the data returned in one of the path verification commands does not match the expected result, or the host path verification command times out, the host removes that logical path from the device path mask. At the completion of the path verification process, the device path mask may or may not still include the failed logical path.

The path verification process can become extremely time consuming if I/O failures are detected for multiple logical control units within the failure window of the several logical paths. As a result, a host computer can expend an inordinate amount of time and processing resources executing path verification commands rather than I/O commands. As a result, data storage system performance can be degraded.

In large, enterprise data processing system environments, a system 390 type host or other hosts that attach to a storage control unit are often use a channel path identifier (CHPid) operation to physically connect to a storage controller host adapter port directly to an input port of a switch. From the switch, the input port can be zoned to go to one or more output ports of the switch. The output port of a switch can be connected to a storage controller port. A host may have configured several CHPids to access different storage controller ports through direct or switch connection.

Through a physical connection between a CHPid and one or more input ports of a storage controller, a host establishes logical paths to communicate with a storage controller. A host may establish one or more logical paths per each logical control unit (LCU) of a storage controller. An LCU is the entity that contains a plurality of devices (e.g., up to 256 devices) to which a host accesses to perform input output (I/O) operations. To access a device from different logical paths of the same CHPid or several CHPids, it is known for a host to group up to eight logical paths into one path group.

Many system configurations can include multiple hosts accessing a single storage controller via a switch fabric. Where a failure is located between the switch and the port of the storage controller, performance of several hosts may be affected. It is also possible that a user might configure the switch through zoning to use one switch port for the connection of logical paths from different hosts. In this case, if different hosts set forth different failure threshold requirements, there would be a conflict in threshold requirements among the several hosts sharing the same physical connection between the switch fabric and the storage controller.

SUMMARY OF THE INVENTION

In accordance with the present invention, a system for providing hosts with a capability to determine which threshold rule of a plurality of threshold rules to use based upon threshold consensus is set forth.

For example, the system would address a configuration case of several hosts sharing an output port of a fabric via zoning and that port being connected to a single port of a storage controller. If one host is executing lower priority jobs and its threshold is much higher than another host with higher priority jobs and a lower threshold, and the storage controller recognizes that several hosts are sharing the same storage controller port, the consensus will be to ignore the threshold of the first host and to use the threshold of the second host to prevent performance degradation in the system.

More specifically, in one embodiment, the invention relates to a method to minimize performance degradation during communication path failure in a data processing system. The data processing system comprises a plurality of host computers, a storage controller and a plurality of physical paths in communication with the host computer and the storage controller. The method comprises establishing a threshold communication path error rate via a failure threshold command for each of the plurality of host computers; determining whether the plurality of host computers share a common resource corresponding to respective threshold communication path error rates; performing a consensus operation on the respective threshold communication path error rates to identify a preferred threshold communication path error rate, the consensus operation enabling avoidance of performance degradation due to conflicting threshold communication path error rates; determining an (i)th actual communication path error rate for an (i)th physical communication path, wherein said (i)th physical communication path is one of said plurality of physical communication paths in communication with said host computer and said storage controller; and, discontinuing use of said (i)th physical communication path if said (i)th actual communication path error rate is greater than said preferred threshold communication path error rate.

In another embodiment, the invention relates to an apparatus to minimize performance degradation during communication path failure in a data processing system. The data processing system comprises a plurality of host computers, a storage controller and a plurality of physical paths in communication with the host computer and the storage controller. The apparatus comprises means for establishing a threshold communication path error rate via a failure threshold command for each of the plurality of host computers; means for determining whether the plurality of host computers share a common resource corresponding to respective threshold communication path error rates; means for performing a consensus operation on the respective threshold communication path error rates to identify a preferred threshold communication path error rate, the consensus operation enabling avoidance of performance degradation due to conflicting threshold communication path error rates; means for determining an (i)th actual communication path error rate for an (i)th physical communication path, wherein said (i)th physical communication path is one of said plurality of physical communication paths in communication with said host computer and said storage controller; means for discontinuing use of said (i)th physical communication path if said (i)th actual communication path error rate is greater than said preferred threshold communication path error rate.

In another embodiment, the invention relates to a data processing system comprising a plurality of host computers, a storage controller; a plurality of physical paths in communication with the plurality of host computers and the storage controller; and, a system for minimizing performance degradation during communication path failure in a data processing system. The system comprises instructions for establishing a threshold communication path error rate via a failure threshold command for each of the plurality of host computers; determining whether the plurality of host computers share a common resource corresponding to respective threshold communication path error rates; performing a consensus operation on the respective threshold communication path error rates to identify a preferred threshold communication path error rate, the consensus operation enabling avoidance of performance degradation due to conflicting threshold communication path error rates; determining an (i)th actual communication path error rate for an (i)th physical communication path, wherein said (i)th physical communication path is one of said plurality of physical communication paths in communication with said host computer and said storage controller; and, discontinuing use of said (i)th physical communication path if said (i)th actual communication path error rate is greater than said preferred threshold communication path error rate.

The above, as well as additional purposes, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further purposes and advantages thereof, will best be understood by reference to the following detailed description of an illustrative embodiment when read in conjunction with the accompanying drawings, where:

DETAILED DESCRIPTION

This invention is described in preferred embodiments in the following description with reference to the Figures, in which like numbers represent the same or similar elements. Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

The described features, structures, or characteristics of the invention may be combined in any suitable manner in one or more embodiments. In the following description, numerous specific details are recited to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

Figure 1:
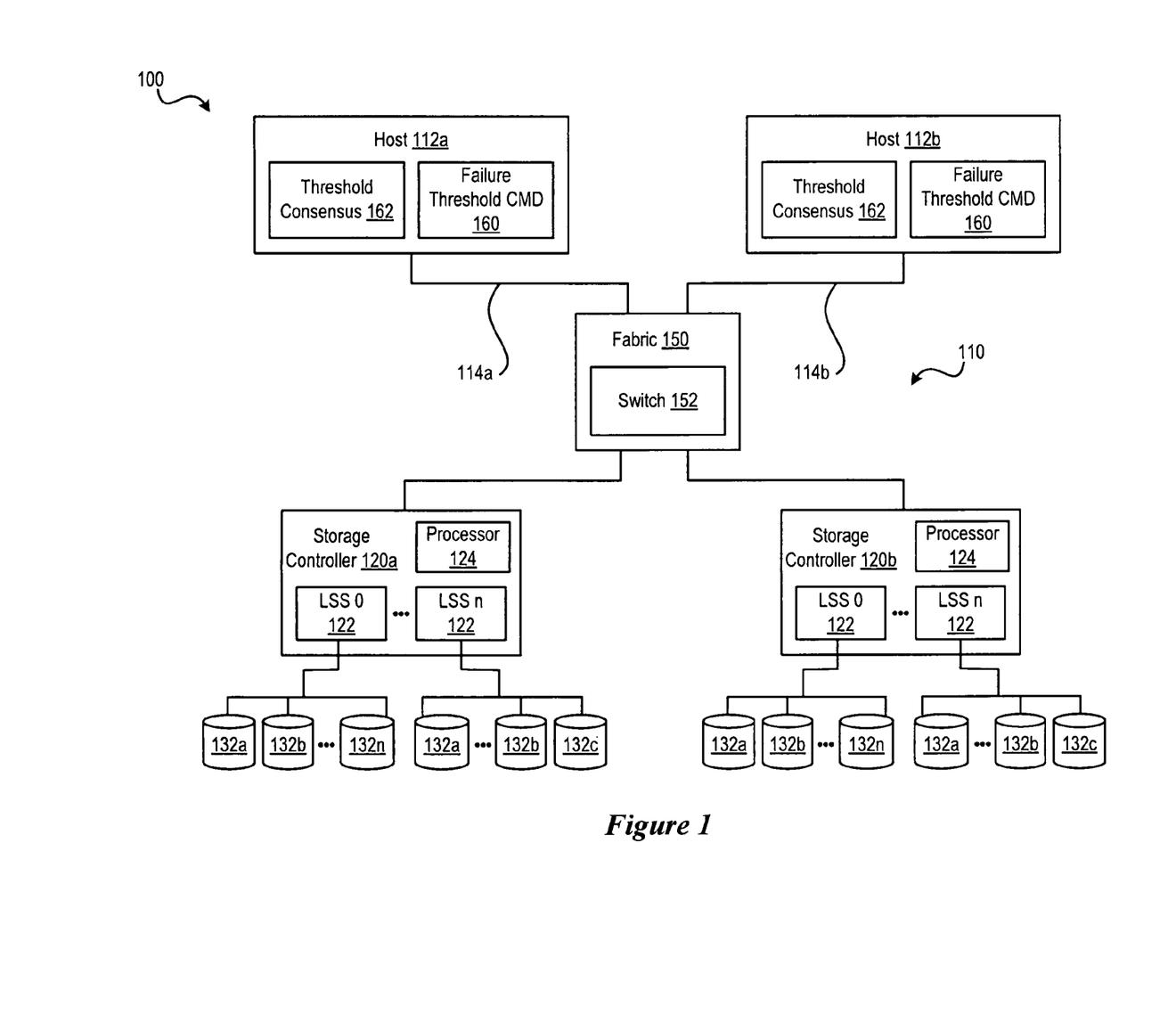
FIG. 1 is a block diagram showing a storage controller communication path manager in communication with a data storage system.

Referring now to FIG. 1, a data processing system 100 comprises data storage system 110 and one or more host computers 112 (also referred to as hosts). The storage system 110 is in communication with host computer 112 via physical communication paths 114a, 114b. Communication paths 114a, 114b each comprise a physical communication link, where that physical communication link can be configured to comprise up to 256 logical pathways. The illustrated embodiment shows two host computers. In other embodiments, data storage system 110 may be in communication with one or a plurality of host computers.

Although the system is described in terms of a storage control unit or "controller" and logical storage subsystems (LSS), the system may be implemented with other devices as well. The storage system 110 includes a storage system such as those available from International Business Machines under the trade designation IBM DS6000 or DS8000. In certain embodiments, the storage system 110 includes two storage controllers 120a and 120b, storage devices 122, such as hard disk drivers (HDDs).

In certain embodiments, the storage system 100 can further include a communication fabric 150. The communication fabric includes, for example, one or more switches 152 such as Fibre Channel (FC) switches. In certain embodiments, those one or more switches 152 may comprise one or more conventional router switches. The switches 152 interconnect the hosts 112 to the storage controller 120 via communication paths, using any type of known I/O interface, such as for example, a Fibre Channel, Infiniband, Gigabit Ethernet, Ethernet, TCP/IP, iSCSI, SCSI I/O interface, or one or more signal lines used by FC switch 152 to transfer information through, to, and from the storage controller 120, and subsequently the plurality of data storage devices 132.

The host 112 is coupled to the storage controller via appropriate connections (such as the fabric 150) through which commands, queries, response and other information are exchanged. The storage controller 120 may be configured with one or more logical storage subsystems (LSSs) 132 (e.g., LSS 0, LSS 1, . . . LSS n). Each LSS is assigned one or more storage devices 132. The logical storage subsystems 132 may be included within one or more logical paths.

The host computer 112 includes provision for execution of a failure threshold host command 160. The failure threshold host command 160 enables a host 112 to provide path failure threshold rules to determine when a CHPid has reached a failed state condition. The failure threshold host command 160 includes parameters that contain the path failure threshold rules. The storage controller 120 uses the path failure threshold rules to determine when a CHPid has reached failed state. The threshold rules are maintained in storage controller CHPid information data structures.

More specifically, the failure threshold host command 160 enables the host 112 to have control over path failures detected by the storage controller. Furthermore, the failure threshold host command enables the host to decide to setup the threshold rules equally for all CHPid, equally for all CHPid that comprised a path group, differently for each CHPid, or a combination based on the number of paths available at the time of the paths failures.

The threshold rules defined by the failure threshold host command are based on the application performance desired. Therefore, the failure threshold host command enables a host to set forth tight threshold rules for high performance applications, as well as a different threshold rule for medium performance applications, and a very different threshold rule for applications that do not care about performance, but want the job to be completed. The threshold rule should indicate the number of path failures within a defined failure window that would trigger a CHPid failure state condition.

The host 112 could issue the new command as often as it needs based on the applications performance requirements. Once the new command completes successfully, the new path failure threshold rules would immediately take effect on the storage controller.

Each of the hosts 112 also includes a threshold consensus system 162. The systems 162 enable the hosts 112 to determine which threshold rules, such as those set via the host failure threshold command 160, to use to avoid performance degradation in the system 100.

Figure 2:
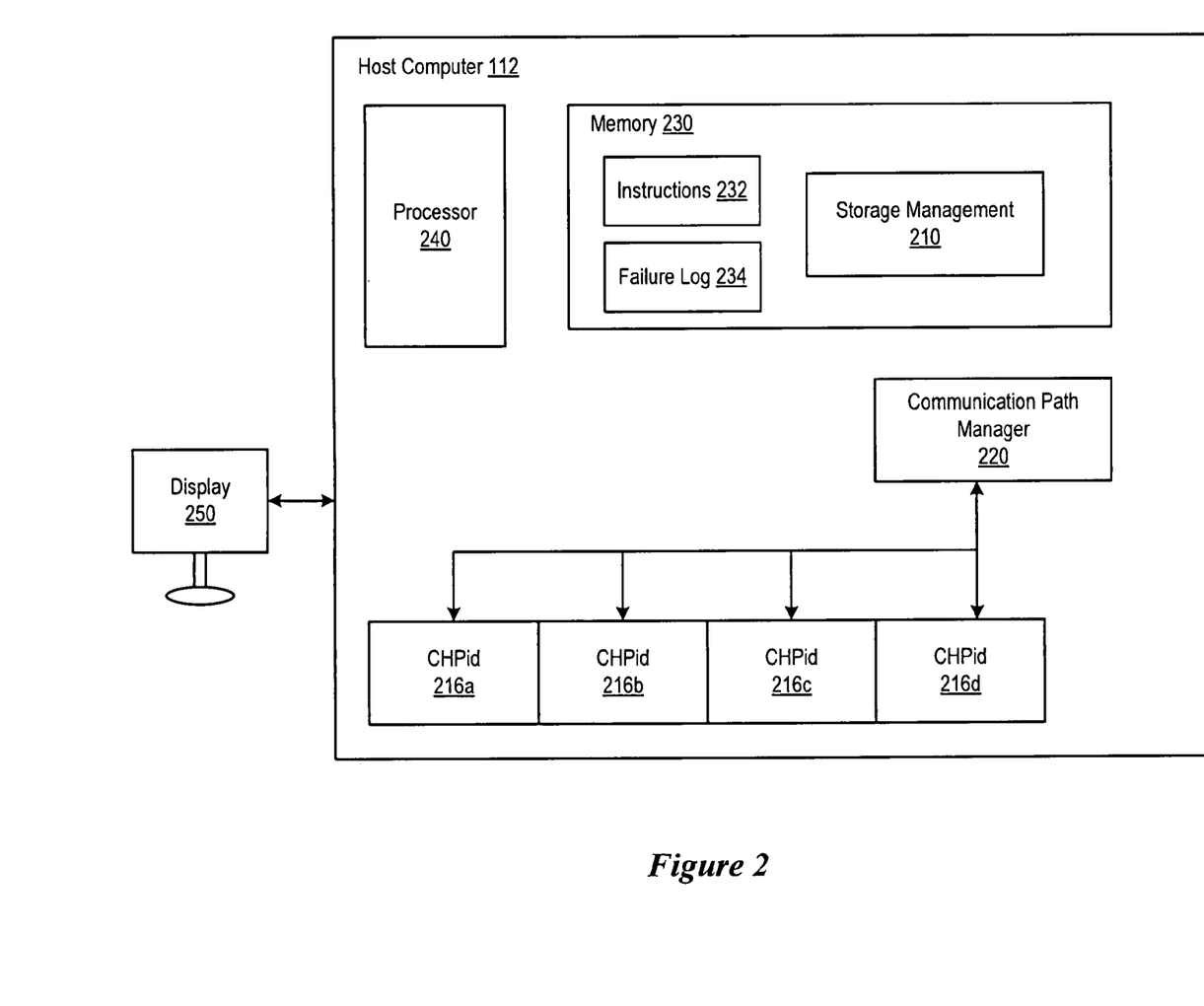
FIG. 2 is a block diagram showing a host computer communication path manager.

Referring to FIG. 2, the host computer 112 comprises a computer system, such as a mainframe, personal computer, workstation, and combinations thereof, including an operating system such as Windows, AIX, Unix, MVS, LINUX, etc. (Windows is a registered trademark of Microsoft Corporation; AIX is a registered trademark and MVS is a trademark of IBM Corporation; and UNIX is a registered trademark in the United States and other countries licensed exclusively through The Open Group.) The host computer 112 can further include a storage management program 210. The storage management program in the host computer 112 may include the functionality of storage management type programs known in the art that manage the transfer of data to a data storage and retrieval system, such as the IBM DFSMS implemented in the IBM MVS operating system.

The host computer 390 comprises a plurality of channel path identifiers ("CHPids") (e.g., CHPids 216a, 216b, 216c, 216d). CHPids 216a, 216b, 216c, 216d, are physically interconnected to respective host adapters within the storage controller 120. The host computer 112 further comprises a communication path manager 220, where the communication path manager 220 is in communication with each of CHPids 216. In certain embodiments, the communication path manager 220 configures each of communication paths, to comprise up to 256 logical communication pathways.

The host computer 112 further comprises a memory 230 (e.g., a computer readable medium). In addition to the storage management program 210, additional instructions 232 and a physical path failure log 234 are stored on the memory 230. The instructions 232 and the storage management program 210 may be loaded executed by a processor 240. The host computer 390 is interconnected with display device 250. The display device 250 may integral with host computer 112 or may be remote from host computer 112. For example, the display device 250 may be located in a system administrator's office.

Figure 3:
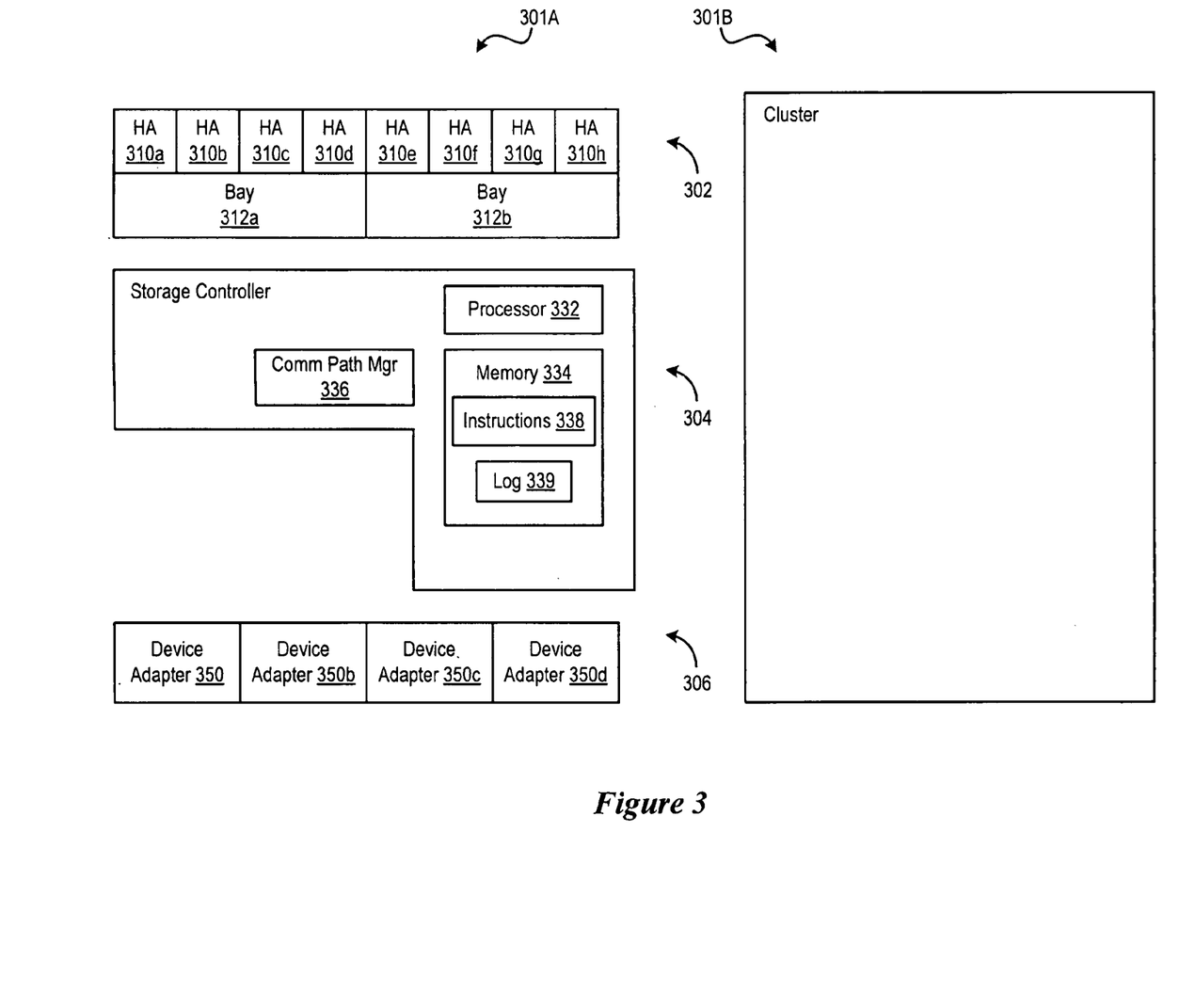
FIG. 3 is a block diagram showing a host computer in communication with a storage controller via a fabric comprising one or more switches.

Referring to FIG. 3, in certain embodiments, the data storage system 110 comprises a first cluster 301A and a second cluster 301B, where clusters 301A and 301B may be disposed within the same housing. Each cluster includes a host adapter portion 302, a storage controller portion 304 and an input/output portion 306.

The host adapter portion 302 comprises a plurality of host adapters (HAs) 310, disposed in four host bays 312, where each host bay 312 houses four host adapters 310. The data storage system 110 can include fewer than 16 host adapters. Regardless of the number of host adapters disposed the data storage system 110; each host adapter 310 comprises a shared resource that has equal access to processing elements (e.g., processor 332) and cache elements (e.g., memory 334) of the data storage system 110.

Each host adapter 310 may comprise one or more Fibre Channel ports, one or more FICON ports, one or more ESCON ports, or one or more SCSI ports. Each host adapter 310 is connected to both clusters 301A and 301B through an interconnect bus such that each cluster can handle I/O from any host adapter 310, and such that the storage controller portion of either cluster can monitor the communication path error rate for every communication path, physical and/or logical, interconnected with data storage system 100.

Storage controller portion 304 includes processor 332 and memory (e.g., a computer readable medium) 334. In certain embodiments, the memory 334 comprises random access memory. In certain embodiments, memory 334 comprises non-volatile memory. The storage controller portion 304 can further include instructions 338 as well as a physical communication path failure log 339 stored within the computer readable medium.

Storage controller portion 304 further comprises communication path manager 336. In certain embodiments, communication path manager 336 comprises an embedded device disposed in storage controller portion 304. In other embodiments, communication path manager 336 comprises computer readable program code (such as the instructions 338) written to the memory 334. The processor 332 executes instructions 338 to implement the steps of the method for minimizing performance degradation.

The I/O portion 306 comprises a plurality of device adapters 350.

In certain embodiments, one or more host adapters, a storage controller portion 304, and one or more device adapters, are packaged together on a single card disposed in a data storage system. Similarly, in certain embodiments, one or more host adapters, a storage controller portion 304, and one or more device adapters, are disposed on another card disposed in the data storage system. In these embodiments, the storage system 110 includes two cards interconnected with a plurality of data storage devices.

In the embodiment shown in FIGS. 1-3, sixteen data storage devices are organized into two arrays (array A and array B). In other embodiments, a data storage system can include fewer (i.e., a single storage array) or more than two storage device arrays. Each storage array appears to a host computer as one or more logical devices (i.e., as a logical storage system (LSS)).

In certain embodiments, one or more of the data storage devices comprise a plurality of hard disk drive units, such as plurality of disk drive units 132. In certain embodiments, the arrays A and B may utilize a RAID protocol. In certain embodiments, the arrays A and B may comprise what is sometimes referred to as a JBOD array, i.e. "Just a Bunch Of Disks" where the array is not configured according to RAID. As those skilled in the art will appreciate, a RAID (Redundant Array of Independent Disks) rank comprises independent disk drives configured in an array of disk drives to obtain performance, capacity and/or reliability that exceeds that of a single large drive.

In certain embodiments, the storage system 110 may be in communication with a service center (not shown). In certain embodiments, the storage system 110 provides information relating to system performance to service center at pre-determined time intervals. In certain embodiments, the storage system 110 immediately provides error messages to service center upon detection of a physical communication path performance degradation.

Figure 4:
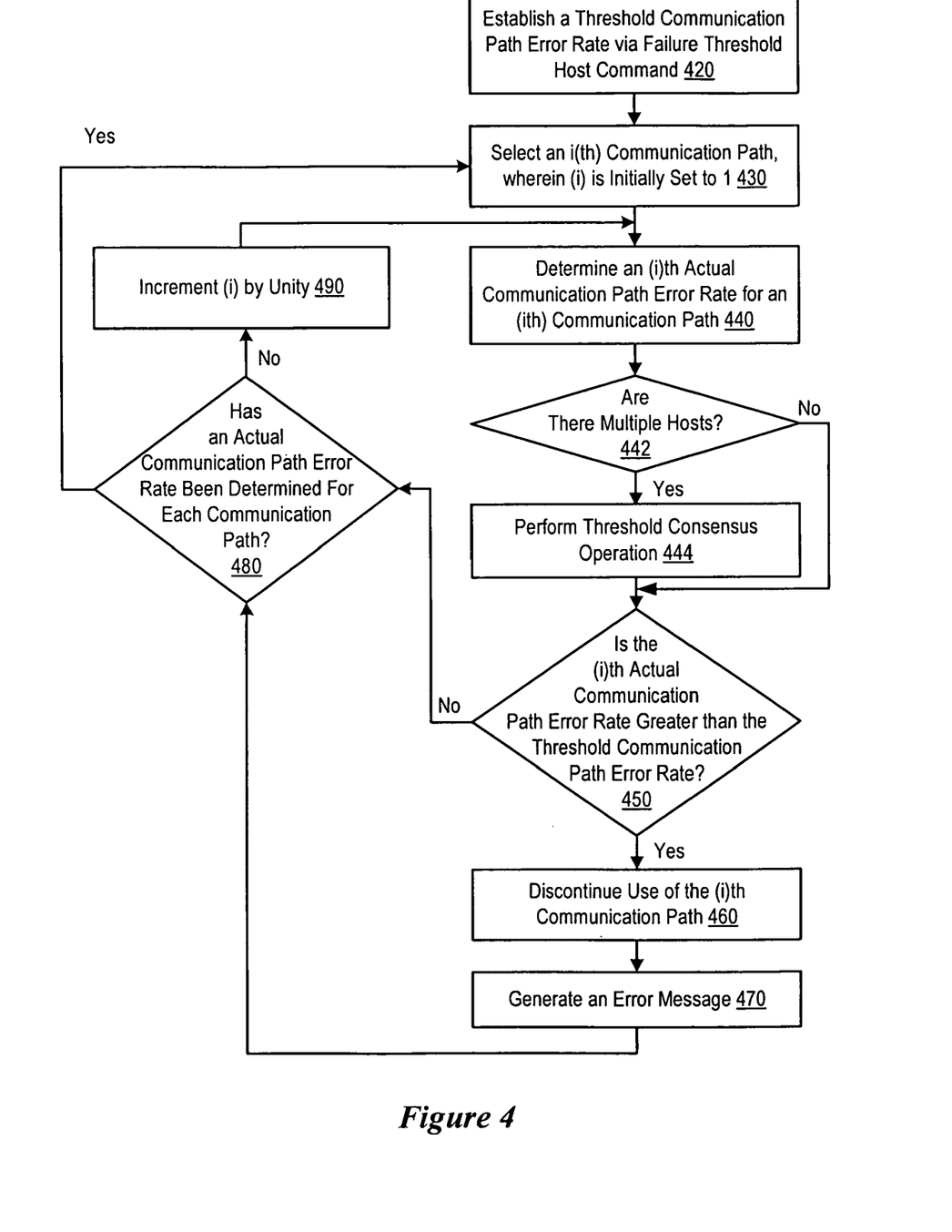
FIG. 4 is a flow chart of an operation to minimize performance degradation during communication path failure.

The data storage system includes provision for minimizing performance degradation during communication path failure in a data processing system. FIG. 4 shows a flow chart of the operation for minimizing performance degradation during communication path failure via a failure threshold host command.

In step 420, the method establishes a threshold communication path error rate via the failure threshold host command. In certain embodiments, the threshold communication path error rate of step 420 comprises the maximum number of I/O failures allowable during a specified time interval.

In certain embodiments, a threshold communication path error rate is set by the operator of each host computer. If data storage system 110 is in communication with a plurality of host computers, each of the host computers could specify a different and unique threshold communication path error rate via respective failure threshold host commands. In certain embodiments, the threshold communication path error rate of step 420 is set by the operator of the data storage system 110 or storage controller 120.

In step 430, the method selects an (i)th communication path, where (i) is initially set to one. In certain embodiments, step 430 is performed by a host computer such as host computer 112. In certain embodiments, step 430 is performed by a communication path manager, such as communication path manager 220, disposed in the host computer.

In certain embodiments, step 430 is performed by a storage controller such as storage controller 120. In certain embodiments, step 430 is performed by a path management function the storage controller 120. In certain embodiments, step 430 is performed by both clusters, such as clusters 301A and 301B, disposed in a data storage system 112. In certain embodiments, step 430 is performed by a path management function disposed in cluster 301A and/or by a path management function disposed in cluster 301B.

In step 440, the method determines an (i)th actual communication path error rate for an (i)th physical communication path. In certain embodiments, step 440 is performed by the host computer 112. In certain embodiments, step 440 is performed by a communication path manager 220. In certain embodiments, step 440 is performed by the storage controller 120. In certain embodiments, step 440 is performed by a path management function disposed in the storage controller. In certain embodiments, step 440 is performed by both clusters, such as clusters 301A and 301B, disposed in the data storage system 110. In certain embodiments, step 440 is performed by a path management function disposed in cluster 301A and/or by a path management function disposed in cluster 301B.

In step 442, the method determines whether there are multiple hosts present within the system 100. In certain embodiments, step 442 is performed by the host computer 112. In certain embodiments, step 442 is performed by a communication path manager 220. In certain embodiments, step 442 is performed by the storage controller 120. In certain embodiments, step 442 is performed by a path management function disposed in the storage controller. In certain embodiments, step 442 is performed by both clusters, such as clusters 301A and 301B, disposed in the data storage system 110. In certain embodiments, step 440 is performed by a path management function disposed in cluster 301A and/or by a path management function disposed in cluster 301B. If there are multiple hosts present as determined at step 442, the method proceeds to step 444. If there are not multiple hosts present, the method proceeds to step 450.

In step 444, the method performs a threshold consensus operation. The threshold consensus operation determines which threshold rule of a plurality of threshold rules to use based upon threshold consensus. In certain embodiments, step 444 is performed by the host computer 112. In certain embodiments, step 444 is performed by a communication path manager 220. In certain embodiments, step 444 is performed by the storage controller 120. In certain embodiments, step 444 is performed by a path management function disposed in the storage controller. In certain embodiments, step 444 is performed by both clusters, such as clusters 301A and 301B, disposed in the data storage system 110. In certain embodiments, step 444 is performed by a path management function disposed in cluster 301A and/or by a path management function disposed in cluster 301B.

In step 450, the method determines if the (i)th actual communication path error rate of step 440 is greater than the threshold communication path error rate set via the failure threshold host command of step 420. In certain embodiments, step 450 is performed by the host computer 112. In certain embodiments, step 450 is performed by the communication path manager 220. In certain embodiments, step 450 is performed by the storage controller 120. In certain embodiments, step 450 is performed by a path management function disposed in the storage controller 120. In certain embodiments, step 450 is performed by both clusters, such as clusters 301A and 301B. In certain embodiments, step 450 is performed by a path management function disposed in cluster 301A and/or by a path management function disposed in cluster 301B.

If the method determines in step 450 that the (i)th actual communication path error rate of step 440 is greater than the threshold communication path error rate of step 420, then the method transitions from step 450 to step 460 where the method discontinues using the (i)th physical communication path. In certain embodiments, the (i)th physical communication path may comprise up to 256 logical communication paths. It may be the case that only one of those 256 logical communication paths has failed. By discontinuing use of the entire physical communication path, the use of operable logical communication paths is also discontinued. However, discontinuing use of the (i)th physical communication path avoids expending host computer processing time to identify the one or more failed logical communication paths. Repair of the physical connection can be deferred until a more convenient time when such repair causes no impact on data storage system performance.

For example, the determination that an (i)th actual communication path error rate exceeds a threshold communication path error rate may be made at a first time, but the identification of and/or repair of the one or more degraded logical communication paths configured by the (i)th physical communication path can be made at a second time, where the time interval between the first time, i.e. failure detection, and the second time, i.e. degraded logical path determination and repair, can be hours. In certain embodiments, the time interval between the first time and the second time can be as great as 24 hours.

In certain embodiments, step 460 is performed by the host computer 112. In certain embodiments, step 460 is performed by the communication path manager 220 disposed in the host computer 112. In certain embodiments, step 460 is performed by the storage controller 120. In certain embodiments, step 460 is performed by a path management function disposed in the storage controller 120. In certain embodiments, step 460 is performed by both clusters, such as clusters 301A and 301B. In certain embodiments, step 460 is performed by a path management function disposed in cluster 301A and/or by a path management function disposed in cluster 301B.

In step 470, the method displays an error message on a display device. In certain embodiments, step 470 further comprises making a log entry to a physical communication path failure log, such as log 234. In certain embodiments, step 470 further comprises providing the physical communication path failure log entry to a service center. In certain embodiments, step 470 is performed by the host computer 112, where the error message is displayed on the display device 250. In certain embodiments, step 470 is performed by a communication path manager 220, where the error message is displayed on the display device 250. In certain embodiments, step 470 is performed by the storage controller 120 where the error message is displayed on a display device disposed in a service center in communication with the storage controller. In certain embodiments, step 470 is performed by a path management function disposed in the storage controller, where the error message is displayed on a display device disposed in a service center in communication with the storage controller. In certain embodiments, step 470 is performed by both clusters, such as clusters 301A and 301B where if either cluster determines in step 450 that an (i)th actual communication path error rate of step 440 is greater than the threshold communication path error rate of step 420, then an error message is displayed on a display device, such as a display device disposed in a service center in communication with the data storage system. In certain embodiments, step 470 is performed by a path management function disposed in cluster 301A and/or by a path management function disposed in cluster 301B, where if either path management function determines in step 450 that an (i)th actual communication path error rate of step 440 is greater than the threshold communication path error rate of step 420 an error message is displayed on a display device, such as a display device disposed in a service center in communication with the data storage system.

In step 480, the method determines if an actual communication path error rate has been determined for each of the plurality of communication paths. For example, if the plurality of communication paths of step 410 comprise (N) communication paths, then in step 480 the method determines if (i) equals (N). In certain embodiments, step 480 is performed by the host computer 112. In certain embodiments, step 480 is performed by a communication path manager 220. In certain embodiments, step 480 is performed by the storage controller 120. In certain embodiments, step 480 is performed by a path management function disposed in the storage controller 120. In certain embodiments, step 480 is performed by both clusters, such as clusters 301A and 301B, disposed in a data storage system. In certain embodiments, step 480 is performed by a path management function disposed in cluster 301A and/or by a path management function disposed in cluster 301B.

If the method determines in step 480 that an actual communication path error rate has not been determined for each of the plurality of communication paths of the data storage system, then the method transitions from step 480 to step 490 where the method increments (i) by unity, and transitions from step 490 to step 440 and continues as described herein. In certain embodiments, step 490 is performed by the host computer 112. In certain embodiments, step 490 is performed by a communication path manager 220. In certain embodiments, step 490 is performed by the storage controller 120. In certain embodiments, step 490 is performed by a path management function disposed in the storage controller 120. In certain embodiments, step 490 is performed by both clusters, such as clusters 301A and 301B, disposed in a data storage system 110. In certain embodiments, step 490 is performed by a path management function disposed in cluster 301A and/or by a path management function disposed in cluster 301B.

If the method determines in step 480 that an actual communication path error rate has been determined for each of the plurality of communication paths, then the method transitions from step 480 to step 430 and continues as described herein. In certain embodiments, after determining in step 480 that an actual communication path error rate has been determined for each of the plurality of communication paths, the method transition to, and performs, step 430 after a time interval defined by the threshold communication path error rate of step 420.

As an example, if the threshold communication path error rate is based upon a number of I/O failures per minute, then the method performs step 430 within about one minute after transitioning from step 480. Similarly, if the threshold communication path error rate is based upon a number of I/O failures per hour, then the method performs step 430 within about one hour after transitioning from step 480. If the threshold communication path error rate is based upon a number of I/O failures per day, then the method performs step 430 within about one day after transitioning from step 480.

Figure 5:
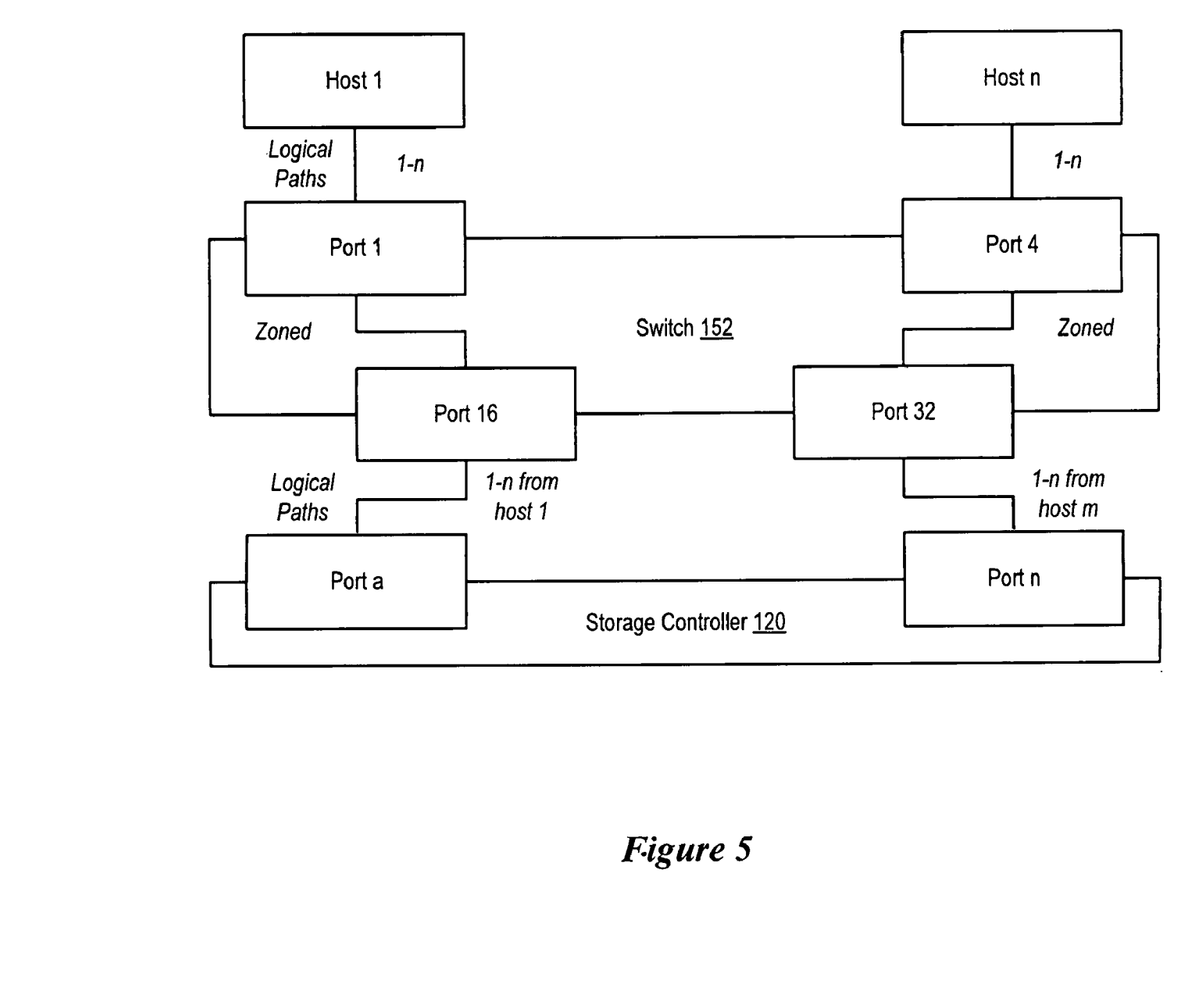
FIG. 5 is a block diagram of a host computer in communication with a data storage system.

Referring to FIG. 5, the consensus system 162 facilitates finding a threshold consensus when multiple hosts are coupled to a single switch fabric. For example, the consensus system 162 would address a configuration case of several hosts sharing an output port (e.g., port 16) of a fabric via zoning and that port being connected to a single port (e.g., port A) of a storage controller 120. If one host is executing lower priority jobs and its threshold is much higher than another host with higher priority jobs and a lower threshold, and the storage controller recognizes that several hosts are sharing the same storage controller port, the consensus will be to ignore the threshold of the first host and to use the threshold of the second host to prevent performance degradation in the system.

Zoning is a partitioning of the switch fabric into smaller subsets to restrict interference, add security and to simplify management. Zoning can be applied to switch ports (i.e., port zoning) or end station names (i.e., name zoning). With port zoning, ports are restricted from communicating with unauthorized ports. Such an operation often applies to homogeneous storage networks (i.e., to a network where all switches correspond to a single vendor). Any device coupled to a specific physical switch port is provided access to the zone. Name zoning restricts access by the world wide node name of the device.

Figure 6:
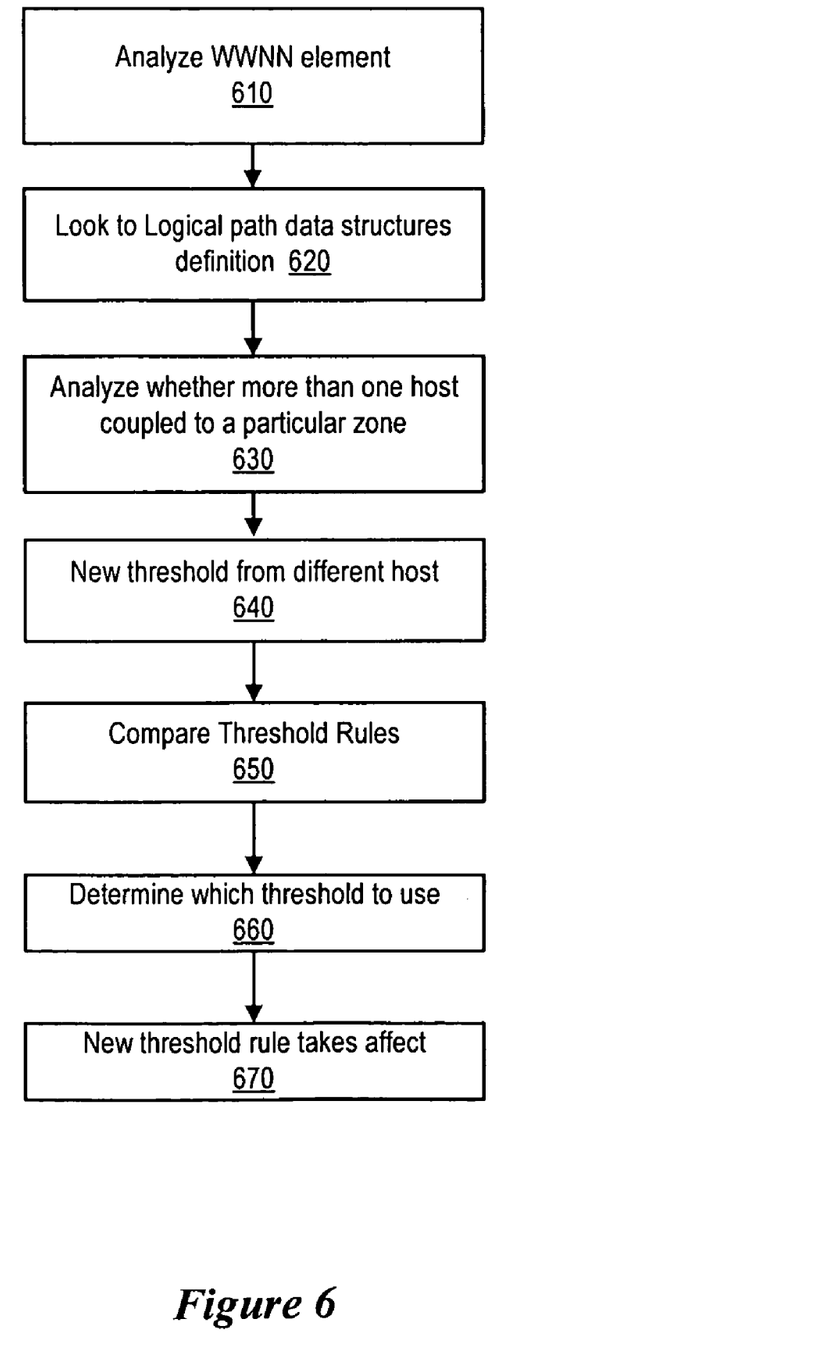
FIG. 6 is a flow chart of the operation of a host threshold consensus system.

Referring to FIG. 6, a flow chart of the operation of a host threshold consensus system is shown. In operation, all threshold rules apply to the system 100. In step 610, the method analyzes a world wide node name (WWNN) element of each logical path data structure. In certain embodiments, step 610 is performed by the host computer 112. In certain embodiments, step 610 is performed by a communication path manager 220. In certain embodiments, step 610 is performed by the storage controller 120. In certain embodiments, step 610 is performed by a path management function disposed in the storage controller 120. In certain embodiments, step 610 is performed by both clusters, such as clusters 301A and 301B, disposed in a data storage system. In certain embodiments, step 610 is performed by a path management function disposed in cluster 301A and/or by a path management function disposed in cluster 301B.

In step 620, look to the logical path data structure definition for an element that identfies the host WWNN. When a logical path is established, the logical path data structures definition contains an element that identifies the host WWNN. Each host has a unique WWNN. In certain embodiments, step 620 is performed by the host computer 112. In certain embodiments, step 620 is performed by a communication path manager 220. In certain embodiments, step 620 is performed by the storage controller 120. In certain embodiments, step 620 is performed by a path management function disposed in the storage controller 120. In certain embodiments, step 620 is performed by both clusters, such as clusters 301A and 301B, disposed in a data storage system. In certain embodiments, step 620 is performed by a path management function disposed in cluster 301A and/or by a path management function disposed in cluster 301B.

In step 630, the method performs an analysis of the WWNN to determine whether more than one host is coupled to a particular zone such as a particular storage controller port. In certain embodiments, step 630 is performed by the host computer 112. In certain embodiments, step 630 is performed by a communication path manager 220. In certain embodiments, step 630 is performed by the storage controller 120. In certain embodiments, step 630 is performed by a path management function disposed in the storage controller 120. In certain embodiments, step 630 is performed by both clusters, such as clusters 301A and 301B, disposed in a data storage system. In certain embodiments, step 630 is performed by a path management function disposed in cluster 301A and/or by a path management function disposed in cluster 301B.

In step 640, the method determines whether the new threshold is from a different host than the existing threshold host. In certain embodiments, step 640 is performed by the host computer 112. In certain embodiments, step 640 is performed by a communication path manager 220. In certain embodiments, step 640 is performed by the storage controller 120. In certain embodiments, step 640 is performed by a path management function disposed in the storage controller 120. In certain embodiments, step 640 is performed by both clusters, such as clusters 301A and 301B, disposed in a data storage system. In certain embodiments, step 640 is performed by a path management function disposed in cluster 301A and/or by a path management function disposed in cluster 301B.

Next, in step 650, the method compares the new threshold rule to the existing threshold rule. In certain embodiments, step 650 is performed by the host computer 112. In certain embodiments, step 650 is performed by a communication path manager 220. In certain embodiments, step 650 is performed by the storage controller 120. In certain embodiments, step 650 is performed by a path management function disposed in the storage controller 120. In certain embodiments, step 650 is performed by both clusters, such as clusters 301A and 301B, disposed in a data storage system. In certain embodiments, step 650 is performed by a path management function disposed in cluster 301A and/or by a path management function disposed in cluster 301B.

Next, in step 660, based upon the comparison, a determination is made regarding which host threshold rules to use. The determination is based upon which threshold rule would have the least performance impact on the system 100. In certain embodiments, step 660 is performed by the host computer 112. In certain embodiments, step 660 is performed by a communication path manager 220. In certain embodiments, step 660 is performed by the storage controller 120. In certain embodiments, step 660 is performed by a path management function disposed in the storage controller 120. In certain embodiments, step 660 is performed by both clusters, such as clusters 301A and 301B, disposed in a data storage system. In certain embodiments, step 660 is performed by a path management function disposed in cluster 301A and/or by a path management function disposed in cluster 301B.

Next, in step 670, the new path host failure threshold rule immediately takes effect if that host threshold rule is by consensus the new threshold rule. In certain embodiments, step 670 is performed by the host computer 112. In certain embodiments, step 670 is performed by a communication path manager 220. In certain embodiments, step 670 is performed by the storage controller 120. In certain embodiments, step 670 is performed by a path management function disposed in the storage controller 120. In certain embodiments, step 670 is performed by both clusters, such as clusters 301A and 301B, disposed in a data storage system. In certain embodiments, step 670 is performed by a path management function disposed in cluster 301A and/or by a path management function disposed in cluster 301B.

In certain embodiments, individual steps recited in FIGS. 4 and 6 may be combined, eliminated, or reordered.

In certain embodiments, the data storage system 100 includes instructions, residing in computer readable medium. The instructions may be executed by a processor to perform one or more of the disclosed steps. In other embodiments, the instructions may reside in any other computer program product, where those instructions are executed by a computer external to, or internal to, data storage system 100 to perform one or more of the disclosed steps. In either case, the instructions may be stored on computer readable medium comprising, for example, a magnetic information storage medium, an optical information storage medium, an electronic information storage medium, and the like. By "electronic storage media," include, for example, one or more devices, such as a PROM, EPROM, EEPROM, Flash PROM, compactflash, smartmedia, and the like.

It is important to note that while the present invention has been described in the context of a fully functioning data processing system, those of ordinary skill in the art will appreciate that the processes of the present invention are capable of being distributed in the form of a computer program product of a computer-readable medium having computer-readable code comprising instructions and a variety of forms and that the present invention applies regardless of the particular type of signal bearing media actually used to carry out the distribution. Examples of computer readable media include recordable-type media such as a floppy disk, a hard disk drive, a RAM, and CD-ROMs and transmission-type media such as digital and analog communication links.

The description of the present invention has been presented for purposes of illustration and description, but is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated. Moreover, although described above with respect to methods and systems, the need in the art may also be met with a computer program product containing instructions for executing non-device specific server commands in a storage control unit.

While the present invention has been particularly shown and described with reference to a preferred embodiment, it will be understood by those skilled in the art that various changes in form and detail may be made therein without departing from the spirit and scope of the invention. Furthermore, as used in the specification and the appended claims, the term "computer" or "system" or "computer system" or "computing device" includes any data processing system including, but not limited to, personal computers, servers, workstations, network computers, main frame computers, routers, switches, Personal Digital Assistants (PDAs), telephones, and any other system capable of processing, transmitting, receiving, capturing and/or storing data.

What is claimed is:

1. A method to minimize performance degradation during communication path failure in a data processing system, the data processing system comprising a plurality of host computers, a storage controller and a plurality of physical paths in communication with the host computer and the storage controller, the method comprising:
    establishing a threshold communication path error rate via a failure threshold command for each of the plurality of host computers;
    determining whether the plurality of host computers share a common resource corresponding to respective threshold communication path error rates;
    performing a consensus operation on the respective threshold communication path error rates to identify a preferred threshold communication path error rate, the consensus operation enabling avoidance of performance degradation due to conflicting threshold communication path error rates;
    determining an (i)th actual communication path error rate for an (i)th physical communication path, wherein said (i)th physical communication path is one of said plurality of physical communication paths in communication with said host computer and said storage controller; and,
    discontinuing use of said (i)th physical communication path if said (i)th actual communication path error rate is greater than said preferred threshold communication path error rate and wherein
    each of the plurality of host computers comprises at least one channel path identifier (CHPid);
    the failure threshold command for a respective host computer enables provision of path failure threshold rules to determine when a CHPid has reached a failed state condition;
    the failure threshold command enables at last one of the plurality of host computers to have control over path failures detected by a storage controller; and,
    the failure threshold command enables at least one of the plurality of host computers to configure the path failure threshold rules for all CHPid, equally for all CHPid that comprise a path group, differently for each CHPid, or a combination based on a number of paths available at a time of a path failure detection.

2. The method of claim 1 wherein:
    the failure threshold command includes parameters that contain path failure threshold rules; and,
    the storage controller uses the path failure threshold rules to determine when a CHPid has reached a failed state.

3. The method of claim 1 wherein:
    the data processing system further comprises a switch fabric; and,
    the shared resources comprise the plurality of host computers sharing an output port of the switch fabric.

4. The method of claim 3 wherein:
    the plurality of host computers share the output port of the switch fabric via zoning.

5. The method of claim 3 wherein:
    the output port is coupled to a single port of the storage controller.

6. The method of claim 1 further comprising:
    determining whether certain of the plurality of host computers are executing lower priority operations and certain of the plurality of host computers are executing higher priority operations; and wherein,
    the consensus operation ignores a threshold of the host computer executing lower priority operations and chooses to use a threshold of the host computer executing higher priority operations.

7. An apparatus to minimize performance degradation during communication path failure in a data processing system, the data processing system comprising a plurality of host computers, a storage controller and a plurality of physical paths in communication with the host computer and the storage controller, the apparatus comprising:
    means for establishing a threshold communication path error rate via a failure threshold command for each of the plurality of host computers;
    means for determining whether the plurality of host computers share a common resource corresponding to respective threshold communication path error rates;
    means for performing a consensus operation on the respective threshold communication path error rates to identify a preferred threshold communication path error rate, the consensus operation enabling avoidance of performance degradation due to conflicting threshold communication path error rates;
    means for determining an (i)th actual communication path error rate for an (i)th physical communication path, wherein said (i)th physical communication path is one of said plurality of physical communication paths in communication with said host computer and said storage controller; and,
    means for discontinuing use of said (i)th physical communication path if said (i)th actual communication path error rate is greater than said preferred threshold communication path error rate; and wherein
    each of the plurality of host computers comprises at least one channel path identifier (CHPid);
    the failure threshold command for a respective host computer enables provision of path failure threshold rules to determine when a CHPid has reached a failed state condition;
    the failure threshold command enables at last one of the plurality of host computers to have control over path failures detected by a storage controller; and,
    the failure threshold command enables at least one of the plurality of host computers to configure the path failure threshold rules for all CHPid, equally for all CHPid that comprise a path group, differently for each CHPid, or a combination based on a number of paths available at a time of a path failure detection.

8. The apparatus of claim 7 wherein:
    the failure threshold command includes parameters that contain path failure threshold rules; and,
    the storage controller uses the path failure threshold rules to determine when a CHPid has reached a failed state.

9. The apparatus of claim 7 wherein:
    the data processing system further comprises a switch fabric; and, the shared resources comprise the plurality of host computers sharing an output port of the switch fabric.

10. The apparatus of claim 9 wherein:
the plurality of host computers share the output port of the switch fabric via zoning.

11. The apparatus of claim 9 wherein:
the output port is coupled to a single port of the storage controller.

12. The apparatus of claim 7 further comprising:
means for determining whether certain of the plurality of host computers are executing lower priority operations and certain of the plurality of host computers are executing higher priority operations; and wherein,
the consensus operation ignores a threshold of the host computer executing lower priority operations and chooses to use a threshold of the host computer executing higher priority operations.

13. A data processing system comprising
a plurality of host computers,
a storage controller;
a plurality of physical paths in communication with the plurality of host computers and the storage controller; and,
a system for minimizing performance degradation during communication path failure in a data processing system, the system comprising instructions for:
establishing a threshold communication path error rate via a failure threshold command for each of the plurality of host computers;
determining whether the plurality of host computers share a common resource corresponding to respective threshold communication path error rates;
performing a consensus operation on the respective threshold communication path error rates to identify a preferred threshold communication path error rate, the consensus operation enabling avoidance of performance degradation due to conflicting threshold communication path error rates;
determining an (i)th actual communication path error rate for an (i)th physical communication path, wherein said (i)th physical communication path is one of said plurality of physical communication paths in communication with said host computer and said storage controller; and,
discontinuing use of said (i)th physical communication path if said (i)th actual communication path error rate is greater than said preferred threshold communication path error rate; and wherein
each of the plurality of host computers comprises at least one channel path identifier (CHPid);
the failure threshold command for a respective host computer enables provision of path failure threshold rules to determine when a CHPid has reached a failed state condition;
the failure threshold command enables at last one of the plurality of host computers to have control over path failures detected by a storage controller; and,
the failure threshold command enables at least one of the plurality of host computers to configure the path failure threshold rules for all CHPid, equally for all CHPid that comprise a path group, differently for each CHPid, or a combination based on a number of paths available at a time of a path failure detection.

14. The data processing system of claim 13 wherein:
the failure threshold command includes parameters that contain path failure threshold rules; and,
the storage controller uses the path failure threshold rules to determine when a CHPid has reached a failed state.

15. The data processing system of claim 13 wherein:
the data processing system further comprises a switch fabric; and,
the shared resources comprise the plurality of host computers sharing an output port of the switch fabric.

16. The data processing system of claim 15 wherein:
the plurality of host computers share the output port of the fabric via zoning.

17. The data processing system of claim 15 wherein:
the output port is coupled to a single port of the storage controller.

18. The data processing system of claim 13 wherein:
determining whether certain of the plurality of host computers are executing lower priority operations and certain of the plurality of host computers are executing higher priority operations; and wherein,
the consensus operation ignores a threshold of the host computer executing lower priority operations and chooses to use a threshold of the host computer executing higher priority operations.

* * * * *